(12) United States Patent
Kim (10) Patent No.: US 12,499,213 B2
(45) Date of Patent: Dec. 16, 2025

(54) COMPUTER HAVING TRANSFORMABLE ARCHITECTURE AND METHOD OF TRANSFORMING VIRTUAL COMPUTERS

(71) Applicant: Deok Woo Kim, Seoul (KR)

(72) Inventor: Deok Woo Kim, Seoul (KR)

( * ) Notice: Subject to any disclaimer, the term of this patent is extended or adjusted under 35 U.S.C. 154(b) by 184 days.

(21) Appl. No.: 18/278,104

(22) PCT Filed: Feb. 17, 2022

(86) PCT No.: PCT/KR2022/002369
§ 371 (c)(1),
(2) Date: Aug. 21, 2023

(87) PCT Pub. No.: WO2022/177327
PCT Pub. Date: Aug. 25, 2022

(65) Prior Publication Data
US 2024/0134964 A1    Apr. 25, 2024

(30) Foreign Application Priority Data

Feb. 19, 2021  (KR) .................. 10-2021-0022464
Apr. 9, 2021   (KR) .................. 10-2021-0046710

(51) Int. Cl.
*G06F 21/53*   (2013.01)
*G06F 21/31*   (2013.01)

(52) U.S. Cl.
CPC .............. *G06F 21/53* (2013.01); *G06F 21/31* (2013.01)

(58) Field of Classification Search
CPC .......... G06F 21/53; G06F 21/31; G06F 21/55; G06F 21/62
See application file for complete search history.

(56) References Cited

U.S. PATENT DOCUMENTS

| 2013/0086202 A1 | 4/2013 | Connelly et al. |
| 2013/0152079 A1* | 6/2013 | Heyman .............. G06F 9/45558 718/1 |
| 2015/0089497 A1 | 3/2015 | Borzycki et al. |

FOREIGN PATENT DOCUMENTS

| JP | 2008-276546 A | 11/2008 |
| KR | 10-2011-0098721 A | 9/2011 |

(Continued)

OTHER PUBLICATIONS

Jeremy Andrus et al., "Cells: A Virtual Mobile Smartphone Architecture", Department of Computer Science Columbia University, Oct. 2011, pp. 173-187.

(Continued)

*Primary Examiner* — Beemnet W Dada
(74) *Attorney, Agent, or Firm* — Sughrue Mion, PLLC (57) ABSTRACT

A computer having a transformable architecture and a method of transforming virtual computers are disclosed. A computer architecture can be transformed such that a user can use a plurality of virtual computers, and thus a data storage unit of a computer transforms a file system according to architecture information selected by an input of the user, and an OS and an application program execute available resource information and the like and provide same to a main unit including a CPU and a memory, thereby safely protecting personal information. The data storage unit actively controls a computer architecture, and thus an access to pieces of information forming inactivated another virtual computer is impossible. Accordingly, security is greatly enhanced.

14 Claims, 3 Drawing Sheets

(56) References Cited

FOREIGN PATENT DOCUMENTS

| KR | 10-2012-0095758 A | 8/2012 |
|---|---|---|
| KR | 10-1432721 B1 | 8/2014 |
| KR | 10-2015-0053282 A | 5/2015 |
| KR | 10-1997254 B1 | 7/2019 |

OTHER PUBLICATIONS

International Search Report for PCT/KR2022/002369 dated Jun. 9, 2022.
Written Opinion for PCT/KR2022/002369 dated Jun. 9, 2022.

\* cited by examiner

```
[Resource_Name1, AVL1]
[Resource_Name2, AVL2]
......
[Resource_NameN, AVLN]
         Resoure_Namex = NAME OF RESOURCE
         AVLx = YES/NO

[OS_START_TYPE]
         OS_START_TYPE = COLD(START AGAIN FROM THE BEGINNING)
                       = WARM(DISPLAY RESTART POINT)
                       = NO_USE(DO NOT RESTART)

[APP_RESTORE]
         APP_RESTORE = YES/NO
```

COMPUTER HAVING TRANSFORMABLE ARCHITECTURE AND METHOD OF TRANSFORMING VIRTUAL COMPUTERS

CROSS REFERENCE TO RELATED APPLICATIONS

This application is a National Stage of International Application No. PCT/KR2022/002369 filed Feb. 17, 2022, claiming priority based on Korean Patent Application No. 10-2021-0022464 filed Feb. 19, 2021 and Korean Patent Application No. 10-2021-0046710 filed Apr. 9, 2021.

TECHNICAL FIELD

The present invention relates to a computer, a mobile device, etc., and more particularly, to an architecture of a computer, a mobile device, etc., capable of minimizing the exposure of personal information of a user.

BACKGROUND ART

In the existing computer, available hardware/software resources, including operating systems (OS), are determined and then the architecture of the computer is determined, when user authentication is performed. Therefore, it is impossible to change the architecture while the computer is in use. In addition, since access to a file system while the computer is in use is controlled by the OS, the user cannot change the entire file system.

The user authentication of the computer is usually performed by comparing an input password or biometric information with pre-stored authentication information, and sometimes user authentication is processed by a separate device using Bluetooth or RFID. Meanwhile, in the case of a mobile device such as a cellular phone or a notepad, the user authentication is performed by the user's pattern drawn on a touch screen, or by recognizing a fingerprint or a personal identification number (PIN).

Since the user authenticated through such authentication method can have access to all resources of the computer, if the computer's architecture is fixed as in the existing computer, a momentary lapse in attention can lead to the exposure of the whole data or programs to third parties. Many cases of personal information leakage in society may occur by malicious code infections or by malicious third parties when computers or mobile devices are lost or repaired. Typically, there are many cases in which problems occur because private photographs or confidential conversations on messengers or social media are exposed. In addition, third parties may steal information when the mobile device is briefly left unattended on a table or desk while the device's authentication is completed. It is also common for users to unknowingly click on links containing malicious codes in text messages or chat windows, leading to malicious code installation on the mobile device and exposing all user information to hackers.

Therefore, it is desirable to minimize information exposure during repairment, or by infection with malicious codes, but with the existing fixed architecture in computers, there is no effective way to achieve this.

DISCLOSURE

Technical Problem

It is an object of the present invention to provide an apparatus and method that allows users to freely change the computer architecture to decentralize personal information, thereby minimizing the risk of information exposure.

Technical Solution

To solve the object, there is provided a computer having a transformable architecture between virtual computers and a method of transforming the virtual computers, which may provide the virtual computers to a user and allow the user to freely change the architecture of the computer to decentralize personal information.

More specifically, according to the present invention, a computer architecture may be transformable so that a user can use a plurality of virtual computers, a data storage unit of the computer may transform a file system in accordance with architecture information selected by a user input, and available resource information or the like may be provided to a main unit in which a central processing unit (CPU) and a memory are included and an operating system (OS) and an application program are executed, thereby safely protecting personal information. In particular, since the data storage unit actively controls the computer architecture, it becomes impossible to access information constituting other inactivated virtual computers, thereby greatly enhancing security. The user can separate the plurality of virtual computers according to their purposes or usage environments and can activate them only when needed, so that it is possible to decentralize data so as to strengthen security. In addition, the user can easily change the architecture into another virtual computer while using a computer, so that it is possible to cope with malicious code infection.

That is to say, to avoid the influence of malicious codes, the data storage unit independently configures a file system according to selected architecture information regardless of the main unit, thereby blocking information leakage that may occur due to infection with malicious codes. As a result, the OS and all application programs operate only within virtual computers generated according to the provided architecture information, thereby significantly enhancing security. Even if the corresponding computer is infected with malicious codes, switching to another virtual computer allows the file system to be changed, and the computer c be selectively cold started or warm started, so that all or part of the OS and all of the applications are reloaded into the main unit, allowing the user to work on a different virtual computer that is not affected by malicious codes.

Meanwhile, for mobile devices such as smartphones or tablet computers, which frequently undergo locking and unlocking, it is believed that a significant improvement in the security can be achieved by applying the present invention to implement multiple virtual mobile devices to be provided on a single mobile device.

The detailed description of the computer of the present invention is as below.

The most critical component in the computer architecture is the data storage unit, which stores in a non-volatile manner the OS, application programs, and user data. In general, information about file system determined by the OS is stored in the data storage unit and loaded into the main memory by a boot program, allowing the computer to be ready for use. However, for the past few decades, the computer architecture has been designed so that the data storage unit is passively controlled by the OS, and it was only a few years ago that the present inventor proposed a technology in which the data storage unit plays a partially active role in a series of registered patents.

Going beyond this, the present invention enables the data storage unit to actively transform the computer architecture according to a user's input, allowing the user to experience the use of multiple virtual computers. In addition, by proposing an architecture that can restore a corresponding computer to normal state even if the OS loses its functionality after being infected with malicious codes, the security of computers or mobile devices can be greatly improved.

Accordingly, the computer providing a plurality of virtual computers according to the present invention enables users to separately use the virtual computers according to their purposes or usage environments. Since only one virtual computer is activated at a time, aside from information on the activated virtual computer, information on other inactive virtual computers is not exposed, thereby greatly improving security.

To this end, in the computer of the present invention, the data storage unit provides the file system and available resource information according to architecture information selected by the user's input to the main unit of the computer that includes CPU and memory and executes OS and application programs, and the data storage unit configures a virtual computer and provides it to the user.

A computer according to the present invention implemented by the above concept has the following features: A computer for providing a plurality of virtual computers according to the present invention includes: a main unit configured to execute an OS and an application program and include a CPU and a memory; a data storage unit connected to the main unit; and an input unit connected to the data storage unit and configured to receive user input information. Here, the user input information of the computer may be input to the data storage unit and performed analysis process; if the user input information indicates architecture transformation, the data storage unit may confirm the architecture information according to user setting information, may perform a preparatory work for architecture transformation according to the architecture information, and may transfer architecture transformation information to the main unit; and the main unit may perform an architecture transformation procedure according to the architecture transformation information received from the data storage unit to allow the computer to be transformed to another virtual computer.

The analysis process performed by the data storage unit may include at least one of deleting the user input information, transferring original information to the main unit, and transferring a result of the analysis process to the main unit.

The architecture information may include "file system configuration information" and "architecture transformation information". Here, the file system configuration information may include information prohibiting use or installation of an application program specified by at least one piece of information among name, manufacturer, and function. The architecture transformation information may include at least one piece of available resource information to be referred to by the main unit, a restart point of the OS, and information about re-execution of the application program. The file system configuration information and the architecture transformation information will be described in detail below. The preparatory work may include terminating operations related to a file system being used by the currently activated virtual computer and selecting and activating a file system to be activated from among a plurality of file systems according to the user input information. Here, the file system may include at least one of an OS, an application program, and user data.

Among information included in the file systems, a duplicate of executable files or of files including data that can be converted into the executable files, a duplicate of the entire file system, or data specially designated by the user may be separately stored in a storage location that is managed by the data storage unit but is inaccessible by the main unit.

The user may restore the corresponding virtual file system by using the duplicates, utilizing a program that manages the user setting information.

The user input information may contain information indicating architecture transformation, wherein such information is created by the data storage unit that receives at least one of time information, space information, and connection/disconnection information of a third communication unit from the main unit, compares the received information to the user setting information, and generates virtual computer information to be newly activated.

The user input information may be user authentication information or may include at least user authentication information. In this manner, when the user input information is the user authentication information or includes the user authentication information, the data storage unit may transfer only information indicating whether the user authentication has passed instead of the user input information so that the main unit cannot distinguish user authentication(s).

Meanwhile, if there is shared information between a virtual computer that is currently activated and in use and a virtual computer that is newly activated and scheduled to be used, the main unit or the data storage unit may operate cooperatively or independently to generate and store moving target information including the content and format of the shared information according to the user setting information, and may allow, when the architecture transformation procedure is completed, the moving target information to be used in a new virtual computer.

The shared information may include at least one of a message, duplicated and stored information, information recorded on a notepad or memo pad, and a file.

A program responsible for the cooperative operation may be implemented according to a program execution environment of the main unit when executed in the main unit, and may be implemented according to a program execution environment of the data storage unit when executed in the data storage unit.

If the main unit of the virtual computer that is currently activated and in use requests information included in the architecture information of the inactivated virtual computer, the data storage unit may confirm and provide the requested information according to the user setting information.

Meanwhile, the user may set or designate one of the plurality of virtual computers implemented in the computer providing the plurality of virtual computers as a primary virtual computer, and may add user authentication information and user setting information of the other virtual computers to setting information of the primary virtual computer.

In addition, the user may duplicate the architecture information of the virtual computer and set the duplicated architecture information as architecture information of another virtual computer.

In addition, if the user clicks an executable link, the virtual computer may activate a predetermined temporary virtual computer and then activate the link in the temporary virtual computer.

A more detailed description of the computer according to the present invention configured as described above is as follows.

In general, information input by the user in a computer is directly processed through an input unit by a main unit executing the OS or application program, regardless of a data storage unit. In this architecture, since malicious codes such as hacking programs or computer viruses are also executed in the main unit, the input information can easily be stolen by the malicious codes. Therefore, if a change in the user authentication information, which is one piece of the user input information, can be recognized by the OS, the malicious codes may also be highly likely to be recognized, and the user authentication information exposed in this manner may lead to security vulnerabilities, and therefore a method to defend against it is needed.

In addition, in the present invention, as the computer's architecture is transformed as if the computer were actually another computer based on user input, someone needs to manage and supervise these processes rather than the main unit itself. As a result, in the computer of the present invention, the process of transferring the user input information is completely different from that of conventional computers. The input unit(s) used by the user to input information are primarily connected to the data storage unit. However, the input unit(s) can also be connected together to the main unit if necessary, or the user input unit may be separately attached to the data storage unit and used for transformation between the virtual computers. That is, in any case, some signals of the input unit(s) are transferred to the main unit through the data storage unit.

Therefore, as described above, the computer providing a plurality of virtual computers according to the present invention may be implemented to include a main unit configured to allow an OS and an application program to be executed and include a CPU and a memory; a data storage unit connected to the main unit; and an input unit connected to the data storage unit and configured to receive user input information.

Here, the user input information of the computer may be input to the data storage unit and analyzed. That is, when information is input by a user, the data storage unit may receive the user input information, analyze the received information, and determine whether to directly transfer the user input information to the main unit, delete the user input information, or generate and transfer a series of corresponding information corresponding to the user input information. In addition, in each case, whether there are operations to be performed by the user may be confirmed and the operations may be performed.

If the user input information indicates architecture transformation, the data storage unit may confirm architecture information according to the corresponding user setting information, perform preparatory work for architecture transformation according to the architecture information, and transfer architecture transformation information to the main unit. Here, the architecture information may contain all information about the architecture of the virtual computer, and may include file system configuration information and architecture transformation information that the main unit should refer to in order to transform the architecture.

More specifically, as to the operation of the data storage unit, when recognizing architecture transformation from the user input information, the data storage unit may execute preparatory work for transformation. This preparatory work may include terminating operations related to a file system being used by the currently activated virtual computer, and selecting, configuring, and activating a file system to be activated from among a plurality of file systems, according to the user input information. When the preparatory work is completed, the data storage unit may transfer the architecture transformation information to the main unit, and then the main unit may perform an architecture transformation procedure according to the architecture transformation information received from the data storage unit, so that the computer may be transformed to a new virtual computer.

The file system configuration information included in the architecture information may refer to information about how the file system to be used by the corresponding virtual computer is configured, and it may include information on the OS and application program or data itself. Accordingly, it is possible for the user to use the OS and application programs differently for each virtual computer. At this time, when the user uses a particular virtual computer, data generated by the OS or application programs can also become a part of the file system. The file system configuration information may include information prohibiting the use of an application program specified by at least one piece of information among name, manufacturer, and function.

Meanwhile, among information included in the file systems, a duplicate of executable files or of files including data that can be converted into the executable files, or a duplicate of the entire file system may be separately stored in a storage location that is managed by the data storage unit but is inaccessible by the main unit. This is necessary to recover the virtual computer when the virtual computer is infected with malicious code. In other words, the malicious code can hide inside the file system in an executable form, so that it is possible to restore virtual computer A using the stored duplicate of executable files or the entire file system when the virtual computer A is infected with malicious code while in use. In addition, the data storage unit may manage information specially designated by the user (e.g., contact information), in a separate storage space in a similar manner.

In addition, the architecture transformation information, which is other information included in the aforementioned architecture information, may include at least one piece of available resource information, a restart point of the OS, and information about re-execution of the application program.

For example, when a virtual computer A in use is transformed to a new virtual computer B, the file system may be changed and available resources may also be changed. When the file system is transformed, a preceding operation may be required, such as stopping a currently executed application program or updating file system information by the OS. At this time, if the virtual computer A and the virtual computer B have the same OS, it is possible to restart the OS in such a manner to minimize the transformation time while minimizing the possibility of malicious code contamination rather than reloading the entire OS. Consequently, the data storage unit may include such information in the architecture transformation information and transfer the architecture transformation information to the main unit. The main unit may then restart a computer through a cold start or warm start, so that all or part of the OS and all or part of the application program may be loaded into the main unit again.

Meanwhile, in order to ensure transformation, such architecture transformation information should be transferred reliably. Accordingly, an interrupt signal can be used in terms of hardware. That is, it is preferable that when the data storage unit outputs an interrupt signal, the main unit processes the transformation process in an interrupt routine.

In order to minimize user's inconvenience in the process in which a virtual computer is transformed to another one, various functions are required.

As described above, if there is shared information between a virtual computer that is currently activated and in use and a virtual computer that is newly activated and scheduled to be used, the main unit or the data storage unit may operate cooperatively or independently to generate and store moving target information including the content and format of the shared information, and the main unit or the data storage unit may allow, when the architecture transformation procedure is completed, the moving target information to be used in a new virtual computer. For example, it may be convenient if a function that enables messages, photographs, information recorded on notepads or memo pads, files, etc., to be duplicated from virtual computer A and the duplicated information to be used on virtual computer B is provided. To this end, a program for cooperative operation or independent operation is executed in the main unit and the data storage unit. At this time, the program executed in the main unit should be implemented according to the program execution environment of the main unit, and the program executed in the data storage unit should be implemented according to the program execution environment of the data storage unit.

In addition, the virtual computer that is currently activated and in use may refer to the architecture information of the inactivated virtual computer. That is, as described above, if the main unit of the virtual computer that is currently activated and in use requests some information included in the architecture information of the inactivated virtual computer, the inactivated virtual computer may confirm and provide the requested information according to the user setting information. This will be described in more detail below.

For example, it is assumed that a user uses virtual computer A and virtual computer B, in which the virtual computer A has personal contact information, and the virtual computer B has business contact information. In addition, it is assumed that the data storage unit stores integrated contact information, including the personal contact information and the business contact information, in its own storage space, and provides the integrated contact information when necessary. In this case, while the user is using the virtual computer A, when there is a conversation request (e.g., when a messenger, phone call, or text message arrives) from another party listed in the business contact information that exists only in the virtual computer B, the communication request may be transferred while the identity of the other party is not revealed. At this point, the user may set to engage in the conversation or to decline the conversation in a predetermined manner.

However, in this case, the main unit (specifically, a program such as an application program or OS being executed in the main unit) may inquire with the data storage unit whether the other party whose identity is not known is listed in the contact information of the file system of another virtual computer, and the data storage unit may confirm this. At this time, the data storage unit may make a response by internally searching for the integrated contact information or by confirming a contact list in the file system of the virtual computer B with reference to the architecture information of the virtual computer B. On the other hand, it is also possible to reflect the information confirmed in this way on a status information display of virtual computer A.

The movement and transfer of data will be described in more detail below.

As in the previous case, when a conversation with the other party included only in the architecture information of the virtual computer B proceeds while a user uses a virtual computer A, the virtual computer A that is currently activated may record the conversation and transfer the recorded conversation to a virtual computer B. That is, when the main unit confirms that the contact information of the other party is included in the contact list of the virtual computer B, it may transfer the relevant content as the moving target information to the data storage unit, and then the data storage unit may reflect the received information to the file system of the virtual computer B. A program responsible for handling such an operation may be produced and provided by a provider of an application program (e.g., a phone call, text message, messenger, social media service, etc.) that is activated in association with the corresponding contact information. In this case, this program needs to be implemented according to the program execution environment of the data storage unit.

Next, a case where a user moves contact information will be described. This situation may frequently occur in a portable computer such as a smartphone or a tablet that is capable of external communication. For example, when a user moves the contact information from a virtual computer A to a virtual computer B, a method for processing records exchanged with the user of the corresponding contact information is required. At this time, when the contact information is moved, the virtual computer A either may delete or may retain the record related to the moved contact information, and it may represent or handle the corresponding identity only using a corresponding phone number because the contact information has been moved. At this time, it may be very convenient to move the related record in the virtual computer A to the virtual computer B. To this end, it is necessary to understand and program the data configuration of the related record, and as described above, the provider of the application program is most suitable for the same.

In addition to above described contact information moving, easily distinguishable file system objects such as photographs or other files can be moved between virtual computers. As a specific example, when files or photographs are moved from a virtual computer A to a virtual computer B, a corresponding user may access a primary virtual computer and select data movement from a user settings menu, and data to be moved may be displayed. The user select a virtual computer B as a destination of the data. Thereby completing the movement of the photographs or files.

Next, as described above, a case in which user input information is user authentication information or includes user authentication information will be described in detail. In mobile devices such as smartphones, locking and unlocking occur frequently, and user authentication is performed upon unlocking. Therefore, it is possible to use a virtual computer that enables multiple user authentications and is determined based on the authentication. For example, when the user authentication information corresponds to a new user authentication rather than an existing user authentication, a procedure for providing a new virtual computer using user setting information according to the corresponding user authentication is performed. However, such user authentication information is required to be transferred to the main unit so as to also disable a screen lock. However, when such user authentication information is transferred as it is, there is a possibility that transformation of the corresponding virtual computer may also be recognized by malicious codes. Therefore, instead of transferring this user authentication information, only whether the user authentication has been successfully passed may be transferred to the main unit regardless of the input user authentication information. For example, when the user authentication information of the virtual computer A is "WORLD" and the user authentication information of the virtual computer B is "KOREA," regardless of these two values, the data storage unit may only transfer whether the user authentication has been successfully passed, to the main unit. The main unit may then process the screen lock accordingly. Therefore, the OS or the malicious code cannot detect that the virtual computer has been transformed, thereby improving security.

Meanwhile, as described above, the user input information may refer to the information indicating the architecture transformation, that the data storage unit receives from the main unit at least one of connectivity status information of a third-party communication unit, time information, and space information, and compares the received information with the user setting information to create information of virtual computer to be newly activated.

In this regard, for example, the user may transform the virtual computer based on time by inputting a time period in the user setting information. For example, when the virtual computer A is set between 09:00 and 18:00, transformation to the virtual computer A is automatically applied at this time period. That is, upon entering this time period, a computer starts a procedure for transformation to the virtual computer A unless the architecture currently in use is the virtual computer A. In addition, the user can perform transformation to the corresponding virtual computer according to his/her location by selecting an area on a map or inputting an address. For example, when Seoul, Korea is set as a virtual computer A, a global positioning system (GPS) starts a procedure for transformation to the virtual computer A when the location of the computer is in Seoul. That is, when the user enters Seoul while using the virtual computer B outside Seoul, a procedure for transformation to the virtual computer A starts. In addition, the user can designate that the virtual computer A is used in a situation where a specific device is connected. For example, the virtual computer A may be set to be used when a computer connects to a wireless local area network (LAN) with a specific location and a specific name, or when a Bluetooth device with a specific name connects to the computer. That is, when the corresponding units connects and the currently used architecture is not a virtual computer A, the computer automatically proceeds with the procedure for transformation to the virtual computer A.

The transformation procedure starts from the data storage unit. The data storage unit periodically inspects the transform conditions of the virtual computer and performs the transformation procedure in the same manner as the transformation of the virtual computer according to the user input information when the transformation is needed.

However, in this case, when the user authentication information is used to indicate as an architecture transformation command, a process of processing the user authentication information is additionally required. In this case, the data storage unit informs the main unit that user authentication is required for transformation to the corresponding virtual computer, and when the corresponding user authentication is performed through cooperative operation with the main unit, it performs preparatory work and performs the transformation procedure according to the architecture information of the virtual computer subjected to the user authentication.

The user authentication process may be performed as follows. The data storage unit may induce the computer to receive new user authentication information, by generating first virtual input information that the computer is locked, by transmitting the generated first virtual input information to the main unit, by generating second virtual input information as if there is a user's attempt to unlock the corresponding computer after a while, and by transmitting the generated second virtual input information to the main unit.

For example, in the case of a Samsung Galaxy phone that is a portable computer, when the power switch is lightly pressed and released, the lock is performed, and when the power switch is lightly pressed and released again in this state, a user authentication procedure for unlocking is performed. Therefore, when the data storage unit manages a power switch input, which is one of the input units according to the present invention, transformation between virtual computers is possible through locking/unlocking operations regardless of the state of the main unit.

However, the power switch of the portable computer such as a Galaxy phone connects to a power control unit, and the power control unit is designed to minimize standby power consumption. That is, in general, when the power switch is pressed for a predetermined period of time or longer, power is applied and the computer starts booting. Therefore, when the power switch is connected only to the data storage unit, the power control circuit is required to be moved to the data storage unit, and therefore a method for coping with the increase in standby power is required. As a result, it is more preferable that the power switch input be commonly supplied to the main unit and the data storage unit including the power control circuit, and the output of the virtual power switch from the data storage unit be input to the main unit, through a power switch signal and an OR gate. As a result, the data storage unit may provide the output of the virtual power switch as a pulse and use the output as a screen lock/unlock, and may turn off or on, by long pulse outputting, the entire power of the corresponding mobile device including the data storage unit itself.

Meanwhile, in order to implement the above function, the data storage unit needs to be aware of information such as location information of GPS data, time information, or a connection status of corresponding Bluetooth. This can be solved such that a GPS driver program, a Bluetooth driver program, or an operating system (OS) periodically writes corresponding data in a reporting space designated by the data storage unit, and the data storage unit periodically refers to the written data.

Next, an operation when the computer is temporarily locked by a user input and then unlocked will be described. For example, when the user unlocks the locked computer using a password or fingerprint recognition, the data storage unit first reads and analyzes this information and then responds accordingly. In the case of a mobile phone temporarily entering a locked state, the main unit may transmit state information to the data storage unit. However, even if the main unit does not transfer the information, the manufacturer may implement the data storage unit in a manner in which locking or unlocking is independently determined in consideration of information related to locking, such as no-input waiting time, power switch input information, and hinge switch input information in the case of a foldable device. In addition, the manufacturer may also make it possible for the data storage unit to independently recognize the moment of unlocking by instructing the user to unlock the lock by simultaneously pressing the volume adjuster or power switch during unlocking.

Further, a case in which one of the virtual computers is designated as a primary virtual computer will be described in detail. As described above, the user may set one of the plurality of virtual computers implemented in the computer providing the plurality of virtual computers according to the present invention as the primary virtual computer, and manage the setting information of the primary virtual computer by including the setting information of the primary virtual computer to the user authentication information and user setting information of other virtual computers. In addition, as described above, the architecture information of the virtual computer may be duplicated and the duplicated architecture information may be set as the architecture information of another virtual computer to be used.

Designating and using one of the virtual computers as the primary virtual computer provides several conveniences. A case where a user starts working on a computer for the first time after purchasing the computer will be described as an example. When the user turns on a computer or mobile device, booting is completed and user authentication is requested. Typically, authentication is performed with a password, pattern input, or biometrics. Upon factory shipment there is no identification information, so a corresponding device may directly provide a usable environment, and however, once the user registers unique identification information, the device may be used only when identification information set by the user and input user authentication information match each other.

Typically, the user inputs identification information by executing a system setting program. Since the computer to which the present invention is applied can be transformed to a plurality of virtual computers, identification information may be separately input so that each of the plurality of virtual computers uses different authentication information. At this time, the total number of virtual computers to be used may be determined by the user or may be pre-determined and provided by the manufacturer.

For example, assuming three virtual computers A, B, and C, using respectively, user authentication A, user authentication B, and user authentication C, a user's system setting program is also provided differently. Since these virtual computers are completely separated from each other, it may be difficult for a user to memorize the user authentication information. Accordingly, it may be significantly convenient if the primary virtual computer is set as virtual computer A and the virtual computer A manages virtual computer architecture information including the user authentication information of the virtual computer B and the virtual computer C. In addition, it may be also convenient to assign a function of duplicating the architecture information of the virtual computer to generate another virtual computer or a function of integrating two virtual computers into one, to the user setting program of the primary virtual computer.

Next, according to the virtual computer according to the present invention as described above, when the user clicks a link in order to respond to infection of malicious code through a chat window or text message, a predetermined virtual computer may be activated and the link may be activated within the corresponding virtual computer. The virtual computer used at this time may be configured to have a file system including an OS and a malicious code detecting program. When the user clicks the link and needs to execute a new code included in the link, the main unit may process the link by moving target information without executing the link unless the user permits, and may perform transformation to the virtual computer according to the architecture information of the virtual computer, and transmit link information to the data storage unit so as to request execution of the link. Then, the data storage unit performs a procedure of transformation to the virtual computer and transfers the moved link to the virtual computer when the transformation is completed, so that the link may be executed. Therefore, although the link was to induce installation of the malicious code, the malicious code is installed in an empty virtual computer with no personal information of the user, and so there is no damage at all. At this time, the user can continue working by reconnecting to the virtual computer that was originally used through the locking and unlocking process. In this case, if necessary, the data storage unit may store application program information that was in use before inactivating the virtual computer that was originally used, and then transfer the stored application program information again so that the application program information can be automatically re-executed. Meanwhile, the user can remove the malicious code by driving a malicious code removal program included in the virtual computer, or by rebuilding the virtual computer in the user setting program of the primary virtual computer.

The concept of the present invention as described above will become clearer through specific examples explained with accompanying diagrams.

Advantageous Effects

According to the present invention, computer architecture can be transformed so that a user can use a plurality of virtual computers, a data storage unit of a computer can transform a file system according to architecture information selected by a user's input, and available resource information, etc. can be executed by an operating system (OS) and an application program and be provided to a main unit including a central processing unit (CPU) and a memory, thereby enabling the user to safely protect his/her personal information.

While it might apply a similar concept to the existing computer system, since the data storage unit is subject to the control of the OS in a passive manner, malicious code can exploit the OS's control mechanism to access inactivated virtual computer architecture information, thus incapacitating security. In contrast, in the present invention, since the data storage unit actively controls the computer architecture, it is impossible to access information forming other inactivated virtual computers, thus greatly enhancing security.

A computer providing a plurality of virtual computers according to the present invention can enable the user to separately use the respective virtual computers according to their purposes or usage environments to decentralize data, thereby enhancing security. In addition, the user can easily transform the architecture to another virtual computer while using a corresponding computer, so that it is possible to efficiently cope with the malicious code infection.

MODES OF THE INVENTION

Hereinafter, exemplary embodiments of the present invention will be described in detail. The terminology used herein is for the purpose of describing particular embodiments only and is not intended to be limiting of the invention. As used herein, singular expressions, unless defined otherwise in context, include plural expressions. It will be further understood that the terms "comprises," "comprising," and the like used herein specify the presence of stated components, steps, operations, and/or elements, but do not preclude the presence or addition of one or more other components, steps, operations, and/or elements.

Figure 1:
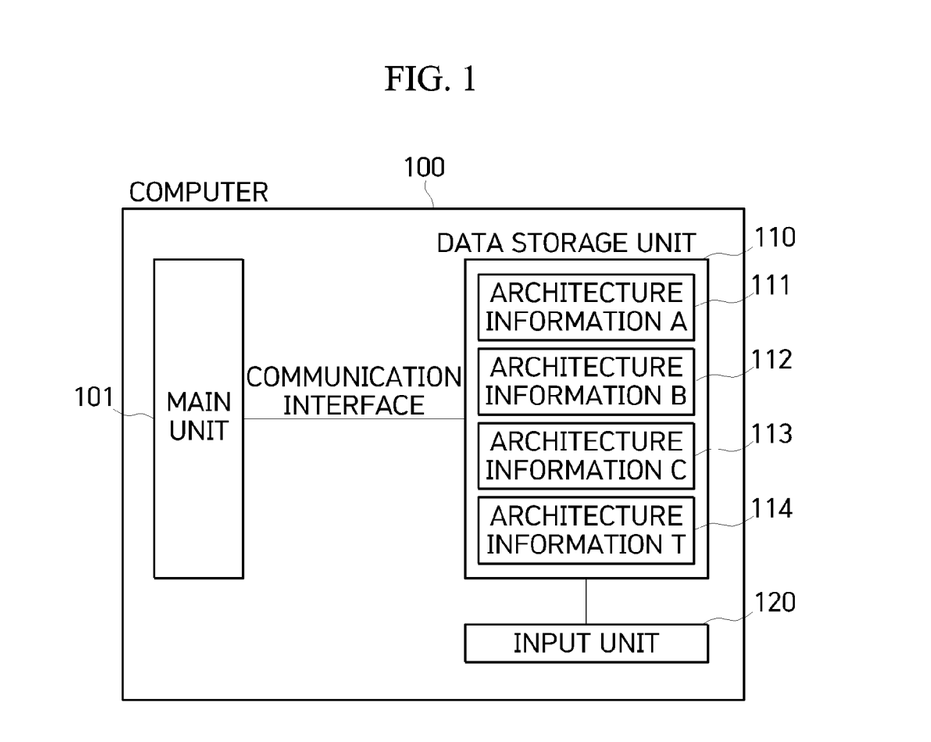
FIG. 1 is a conceptual diagram illustrating a computer having transformable architecture according to an embodiment of the present invention.

FIG. 1 is a diagram briefly illustrating a computer having transformable architecture according to one embodiment of the present invention. In this embodiment, it is assumed that a computer 100 having transformable architecture is configured so that the manufacturer may provide four virtual computers, that is, a virtual computer A, a virtual computer B, a virtual computer C, and a temporary virtual computer. Accordingly, in a data storage unit 110 of the computer 100, architecture information A 111 of the virtual computer A, architecture information B 112 of the virtual computer B, architecture information C 113 of the virtual computer C, and architecture information T 114 of the temporary virtual computer are stored.

Figure 2:
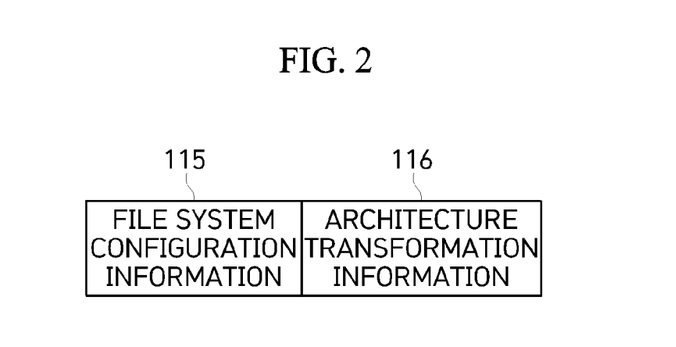
FIG. 2 illustrates architecture information composed of file system configuration information and architecture transformation information.

Each piece of architecture information is composed of file system configuration information 115 and architecture transformation information 116 as described in FIG. 2. The architecture transformation information 116 includes at least one of available resource information, a restart point of an operating system (OS), and information about re-execution of an application program.

Here, transformation of the virtual computer is actually performed by changing the file system. Accordingly, the OS (not shown) provides an interrupt routine for restart or transformation, and the data storage unit 110 performs mapping so that the stored file system can be used by a bootstrap loader and the OS. For example, it is assumed that the bootstrap loader reads data of the data storage unit 110 from cluster 0x00000 to perform a boot process, a file system of the primary virtual computer A is located in clusters 0x000000 to 0x0fffff, a file system of the virtual computer B is located in clusters 0x100000 to 0x1fffff, a file system of the virtual computer C is located in clusters 0x200000 to 0x2fffff, and a file system of the temporary virtual computer T is located in clusters 0x300000 to 0x3fffff. In this case, when the virtual computer A is transformed to the virtual computer B, the data storage unit 110 may transform the file system by mapping the file system of the virtual computer B located in clusters 0x100000 to 0x1fffff to clusters 0x00000 to 0xfffff and providing the mapped file system to the main unit 101 to transform the file system. However, if an OS data storage space, and a user data storage space for storing an application program and data produced by the user are separately used, it is also possible to transform the virtual computer by replacing only the user data storage space. That is, if the user data storage space is located in 0x180000 to 0x1fffff, this portion is mapped to 0x080000 to 0x0fffff. Meanwhile, in this case of mapping, the OS needs to physically place the user data storage space in the corresponding cluster.

The virtual computer A is the primary virtual computer and is authenticated with user authentication information A, the virtual computer B is authenticated with user authentication information B, and the virtual computer C is activated immediately without requiring user authentication when user input information indicating architecture transformation is received from the input unit 120 while the virtual computer A and the virtual computer B are being used.

Meanwhile, when the primary virtual computer is set, it is convenient because the primary virtual computer C manages various things including user authentication identification information of the other virtual computers.

At the time of shipment, basic application programs and an OS (e.g., Android OS) are installed in the primary virtual computer A. When the user installs required application programs and copies and installs related data from a computer used in the past, preparation for use is basically done. On the other hand, it is assumed that the virtual computer A is automatically designated as the primary virtual computer at the time of shipment and architecture information A 111 is also input. In addition, it is assumed that the primary virtual computer uses user authentication by default and the user inputs user authentication information A in the form of a personal identification number (PIN). In this case, the user uses a user setting program of the primary virtual computer A to set architecture information B 112 and architecture information C 113 of the remaining virtual computers.

The user generates architecture information of the virtual computer B and the virtual computer C by duplicating architecture information A 111 using the user setting program in the primary virtual computer, and removes unnecessary application programs to generate architecture information B 112 and architecture information C 113 of these virtual computers. For example, assuming that the user enters an available resource information setting menu in the user setting program and inactivates the use of a code division multiple access (CDMA) communication unit of the virtual computer C, the OS without a driver supporting the corresponding CDMA communication unit may be provided. At this time, the user may select a pattern to be input for a user authentication to the virtual computer B and store identification information as user authentication information B.

In addition, it is assumed that the virtual computer T is configured only with the malicious code removal program and OS provided by the manufacturer, user authentication is not used, and configuration information 114 provided by the manufacturer is provided as an initial value. At this time, the virtual computer T is set to be activated only when the user clicks an executable link and to show the result of activating the link. The virtual computer T may be regenerated in the user setting program, and in this case, the existing information is erased and the OS and malicious code removal program of the primary virtual computer A are newly installed.

In addition, architecture information A 111, architecture information B 112, and architecture information C 113 of each of the virtual computers may be automatically designated in advance based on initial values set at the factory, and include, for example, architecture transformation information such as an OS restart point, available resource information, or whether an application is re-executed, and file system configuration information of the corresponding computer.

In addition, the OS and application program constituting the primary virtual computer A, or a duplicate of executable files or of files including data that can be converted into the executable files, or a duplicate of the entire file system may be stored in a separate storage location managed by the data storage unit 110 and inaccessible by the main unit 101. This is necessary to recover the virtual computer when the virtual computer is infected with malicious code. In other words, the malicious code can hide inside the file system in an executable form, so that it is possible to restore the virtual computer A or the other virtual computers using the duplicate of the stored executable files when the virtual computer A or the other virtual computers are infected with malicious code. In addition, the data storage unit 110 may manage information specially designated by the user, such as contact information, in a separate storage space in a similar manner.

Meanwhile, among the user setting information input in this manner, information such as the lock waiting time required for the data storage unit 110 is also transmitted to the data storage unit 110 through the communication interface between the main unit 101 and the data storage unit 110.

Figure 3:
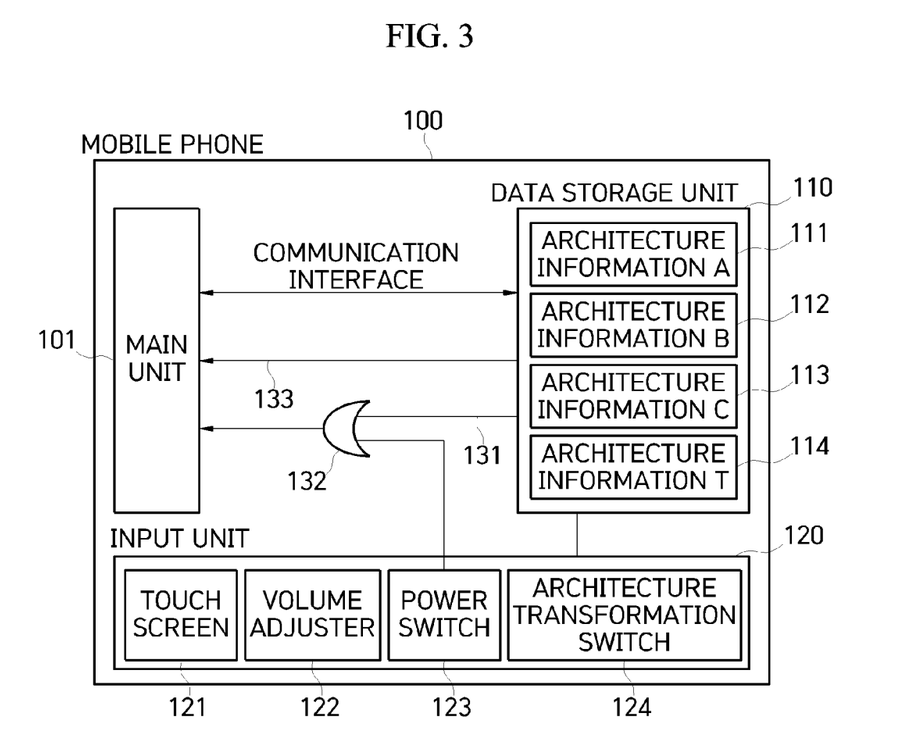
FIG. 3 illustrates an embodiment in which the concept of FIG. 1 is actually applied to a smartphone.

FIG. 3 is a diagram illustrating other embodiment modified from the embodiment of FIG. 1, which illustrates an embodiment applicable to a portable computer such as a mobile phone or a smartphone. Here, reference numeral 100 denotes a mobile phone, and the input unit 120 includes a touch screen input device 121 (briefly, "touch screen"), a volume adjuster 122, a power switch 123, and an architecture transformation switch 124.

The virtual computer C is immediately activated when the architecture transformation switch 124 is pressed while the virtual computer A and the virtual computer B are being used, without user authentication. On the other hand, without the separate architecture transformation switch 124, user input information indicating an architecture transformation command may be input to the data storage unit 110 through an input combination of other input devices in the input unit 120. In any case, in order for the user to return to the virtual computer A or the virtual computer B, an appropriate transformation procedure including a user authentication procedure is required to be performed, if necessary.

Meanwhile, the main unit 101 basically has a central processing unit (CPU) and a memory for executing an OS and application programs, and includes a display unit, a processor and peripheral circuits for processing a mobile communication protocol such as CDMA, a short-range communication circuit (Bluetooth or wireless local area network (LAN)), a universal subscriber identity module (USIM) interface, a power control circuit including a battery and a charging circuit, a circuit for other electronic payments, a camera and related circuits.

The configuration of the main unit 101 of the present embodiment has been shown above, but depending on the circumstances, units related to folding or rolling a memory card or a display may be also added. In other words, there is no limit to the expandability of components for those with a fundamental understanding of computer-related technologies.

Further, the data storage unit 110 is generally composed of a non-volatile memory such as a flash memory or hard disk drive (HDD). In the case of using a flash memory, a flash memory controller is integrated thereto, and in the case of an HDD, a circuit for driving a motor is included therein. In general, these data storage units are implemented in a form having controllability including a CPU and memory, but in this embodiment, it is assumed that they are implemented in the form of a solid state drive (SSD) connected through a non-volatile memory express (NVMe) interface. Meanwhile, the touch screen 121 is usually manufactured by being combined with a display (which can be included in the main unit 101) as one.

Returning to FIG. 3, in general computers or mobile phones, the data storage unit 110, the touch screen 121, and the volume adjuster 122 are directly connected to the main unit 101, but in the computer (or mobile phone) to which the present invention is applied, the touch screen 121 and the volume adjuster 122, which can be used when inputting user authentication information among input devices, are directly connected to the data storage unit 110 as illustrated in FIG. 3. Accordingly, information input from the touch screen 121 and the volume adjuster 122 is first analyzed by the data storage unit 110 and selectively transmitted to the main unit 101.

The volume adjuster 122 is usually constituted of two button switch inputs, that is, a plus volume button and a minus volume button, which can be used in various application programs in addition to volume adjustment. For example, the switch buttons can be used to adjust the brightness of a screen or to adjust the intensity of vibration. In addition, the volume adjuster 122 is used in various ways, such as capturing the screen by pressing the minus volume button and the power switch 123 at the same time.

The power switch 123 may be connected only to the data storage unit 110 (more precisely, connected to a power control circuit (not shown) located in the data storage unit 110). However, in the configuration of FIG. 3, more preferably, the power switch 123 is connected to both the data storage unit 110 and one input pin of an OR gate 132, a virtual power switch output 131 controlled by the data storage unit 110 is connected to the other input pin of the OR gate 132, and an output signal of the OR gate 132 is input to the main unit 101. In this manner, it is preferable in terms of design to connect the power switch 123 to both the data storage unit 110 and the main unit 101 and to place a power control circuit (not shown) in the main unit 101.

The touch screen 121 is generally manufactured in a method specialized for each company, but is finally implemented in the form of reading a register to provide the user with temperature, coordinates, contact pressure, and the like. As for the touch screen input device 121, a capacitive type and a resistive type are widely used, and in most cases, a dedicated controller is in charge of necessary operations such as analog-digital (AD) conversion. Here, the touch screen input device 121 is connected to the main unit 101 through a serial communication bus such as an inter-integrated circuit (I2C) or Universal Serial Bus (USB), so that a corresponding driver program reads coordinates or the like through data communication and provides these read coordinates to the OS or the application program. In the case of using a pen, high-speed processing is sometimes performed using interrupts, but in general, because human finger motions are much slower compared to high-speed operations of devices, a polling method may be used to detect a touch and to read data. In this embodiment, it is assumed that the data storage unit 110 has an I2C communication interface for interface with the touch screen input device 121.

Meanwhile, as described above, in this embodiment, the user may use four virtual computers. By decentralizing or distributing information to the virtual computers in this manner, the security of the mobile phone is greatly improved. For example, contact information, a messaging app (phone, text message, messenger, etc.), a camera, a social media app, and a financial app that require security may be placed in the virtual computer A, contact information, a conversation app (phone, text message, messenger, etc.), a camera app, and a social media app that can be exposed without problems are placed in the virtual computer B, and apps such as Internet search, newspapers, broadcasting companies, shopping, etc., are placed in the virtual computer C.

In addition, assuming that installation of additional apps or deletion of apps in use on the virtual computer B is set to be disabled, even if the mobile phone is sent for repair, exposure of the content of the virtual computer A can be avoided, because the functions of the mobile phone can be sufficiently inspected by the user providing only the user authentication B of the virtual computer B. In addition, since the virtual computer C cannot perform CDMA communication, the virtual computer C can be used only through communication such as wireless LAN.

When the user presses the power switch 123 for a long time, the corresponding input is applied to one input pin of the OR gate 132 and the data storage unit 110 at the same time, and an "ON" signal is generated from the output of the OR gate 131 and the signal is transmitted to the main unit 101. Accordingly, the power control circuit (not shown) operates to supply power to each part, thereby starting booting. When power is applied for the first time, the data storage unit 110 starts working while assuming that the primary virtual computer A is selected. Accordingly, booting is first performed using architecture information 111 of the virtual computer A. As a result, the file system activated and provided at this time is determined according to architecture information A 111. However, this function can also be changed by user settings. That is, when the user inputs information on a virtual computer to be used to the user setting information when the power is first applied, the main unit 101 may transfer the input information to the data storage unit 110, and the data storage unit 110 may determine a file system to be provided based on the transferred input information at the time of booting.

Hereinafter, a case where the main unit 101 presents a user authentication screen will be described. In existing mobile phones, in display of a user authentication screen, when a user authentication method is a PIN, only a PIN input screen is displayed, and when the user authentication method is a pattern, only a pattern input screen is displayed. However, in the case of the present invention, a problem arises because a different type of user authentication is performed by using the existing method. Therefore, in the case of the present invention, modification is required in the existing user authentication process. That is, the main unit 101 alternately presents the user authentication screen in the order of PIN→pattern input→password input, which is possible when the user presses the plus volume button. Specifically, each time the plus volume button is pressed, the data storage unit 110 reads this input and transmits the read input to the main unit 101. As a result, the main unit 101 presents a user authentication input screen of a different method, allowing user authentication to be performed with any type of user authentication.

Therefore, initially, the user authentication screen may be supposed to be the PIN input screen, but when the user presses the plus volume button, the user authentication screen is changed to the pattern input screen. When the user inputs a pattern in this situation and the user input information is user authentication B, the mobile phone starts transformation to the virtual computer B.

However, in order to interpret the input from the touch screen 121, the data storage unit 110 also needs to be aware of the configuration of the user authentication screen currently presented to the user. That is, although the data storage unit 110 can read information such as the coordinates or pressure of a touched point, it is impossible to interpret what these values mean without information on the configuration of the user authentication screen. Therefore, it may be necessary for the main unit 101 to provide the information on the configuration of the user authentication screen to the data storage unit 110.

A similar situation can occur with computers other than mobile phones such as laptop computers. For example, when entering a password using a keyboard, the keyboard is connected to the data storage unit, allowing the data storage unit to immediately recognize key values. However, if a virtual keypad is provided and a mouse is used as the input device, a situation similar to the above example may occur.

Therefore, in order to receive characters or numbers on the touch screen, the keypad may be presented on the screen, the main unit 101 may transfer the location of the presented keypad to the data storage unit 110, and the touch screen 121's driver program which is executed in the data storage unit 110 may read coordinates and input information, and the like. The data storage unit 110 compares this information with the location of the keypad on the screen to determine input information. When one key value is determined in this manner, the data storage unit 110 notifies the main unit 101 that one key value has been determined, and the main unit 101 displays "*" on the input window. When this process is repeated and the Enter key (or OK key) is input, the data storage unit 110 searches, among the virtual computers, for the virtual computer using the user authentication information with the PIN and compares the searched information with the stored identification information. When the identification information and the input user authentication information match each other, an operation for activating the corresponding the virtual computer starts. In this case, the data storage unit 110 notifies the main unit 101 of completion of user authentication through the communication interface with the main unit 101, rather than transmitting the PIN information itself.

On the other hand, a similar process occurs when the user authentication information is received in the form of a pattern. Typically, pattern points are arranged in a grid and displayed on the screen, and connecting these points in sequence generates a pattern. In a case in which the user inputs a pattern, if the user touches a first point on the grid formed by the pattern points and then continues to move his/her finger without lifting the finger, the movement is reported sequentially, and the points are arranged sequentially whenever a pattern point on the grid is touched during the movement. Finally, a data string connecting the pattern points becomes pattern input information for identification.

When a pattern is input, the data storage unit 110 transmits the input touch coordinates to the main unit 101, and the main unit 101 displays the input touch coordinates on the screen. The data storage unit 110 compares the data string connecting the pattern points with the stored identification information by searching for the virtual computer that uses the pattern input as the user authentication information among the virtual computers. When the identification information and the input user authentication information match each other, an operation for activating the corresponding the virtual computer starts. In this case, the data storage unit 110 transmits the coordinates to the main unit 101, but the main unit only displays the coordinates and does not perform any additional operation. The main unit 101 is notified by the data storage unit 110 of whether the user authentication has been successfully performed. Here, in the case of failure, the user authentication screen is presented again, and in the case of success, the next operation that lets the user to use the prepared virtual computer proceeds.

Meanwhile, if the configuration of the user authentication screen is always equally provided (that is, if the location of the keypad used for user authentication and the location of the pattern point grid are fixed), then the data storage unit 110 can independently analyze the user identification information without receiving screen information from the main unit 101. In practice, most mobile phones consistently present the same authentication screen depending on the authentication method, making this implementation desirable.

Hereinafter, a process for transformation to the virtual computer B will be described again. The user input information corresponds to user authentication B even though the corresponding system is booted into the virtual computer A, and therefore a transformation to the virtual computer B is needed. However, based on the analysis result, when user authentication is required for the virtual computer A that is currently activated and in use, the transformation operation is not executed.

For the transformation, the data storage unit 110 confirms architecture information B 112 of the virtual computer B, performs a preparatory work accordingly, and transmits the architecture information to the main unit 101. At this time, the architecture information includes almost all information related to the architecture of the virtual computer, including information on the configuration of the file system (file system configuration information) and information on architecture transformation (architecture transformation information) to be referred to by the main unit 101 to transform the architecture.

Figure 4:
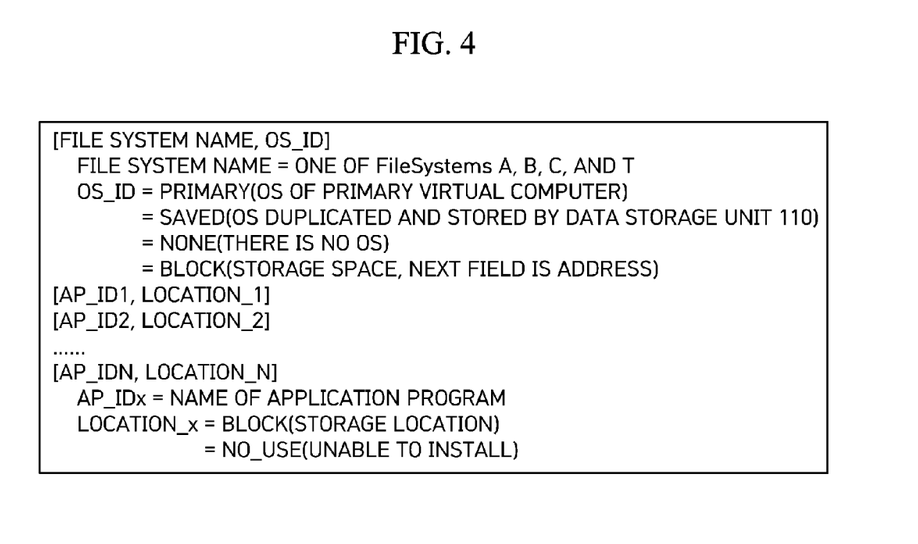
FIG. 4 is an exemplary diagram illustrating file system configuration information.

The file system configuration information 115 is information on how the file system to be used by the corresponding the virtual computer is configured, and may include information on the OS and application program or data itself. For example, the file system configuration information 115 can be expressed as shown in FIG. 4.

If the file system configuration information 115 of the virtual computer B is set as [FileSyetemB, SAVED], ["Samsung phone," ComputerA], ["Samsung message," ComputerA], ["Samsung camera," code0], ["Facebook," code1] and ["TikTok," NO_USE], then the data storage unit 110 brings the stored OS duplicate (a duplicate of the primary virtual computer OS), and fetches data for application programs "Samsung phone" and "Samsung messages" from the file system of the virtual computer A. In addition, it fetches "Samsung camera" from storage location code0 and "Facebook" from storage location code1, to form the file system of the virtual computer B. In addition, according to the user setting information, it adds a user data storage space allocated for the first time or a user data storage space previously being used by the virtual computer B to configure the file system.

However, this configuration may reduce the storage space but increase the data transfer time, so it is more desirable to manage the corresponding storage space as a complete data block, including the OS and the application program. Therefore, in this embodiment, the configuration information is set as [FileSystem B, BLOCK], [0x100000, 0x1fffff], so that the file system of the virtual computer B is located in clusters 0x100000 to 0x1fffff of the storage space managed by the data storage unit 110. For reference, in this data block, the application programs "Samsung phone," "Samsung message," "Samsung camera," and "Facebook" are all installed, including the bootable OS, and the user data storage space of the virtual computer B is also included in the data block. In this case, data generated by the OS or the application programs when the user later uses the corresponding the virtual computer is also recorded in the file system. Therefore, when the architecture transformation process is completed, the user can feel as if he or she is using another computer in which an SSD or HDD has been replaced.

Next, as the virtual computer B needs to be activated, the data storage unit 110 maps the file system of the virtual computer B to clusters 0x000000 to 0x0fffff to finalize its provisioning and transfers the architecture transformation information 116 to the main unit 101, and the main unit 101 performs the architecture transformation procedure according to the architecture transformation information 116 transmitted from the data storage unit 110. Accordingly, the computer is transformed into a new virtual computer. At this time, the architecture transformation information 116 may include at least one of available resource information, a restart point of the OS, and information on re-execution of the application program. For example, the architecture transformation information 116 may be expressed as shown in FIG. 5.

Figure 5:
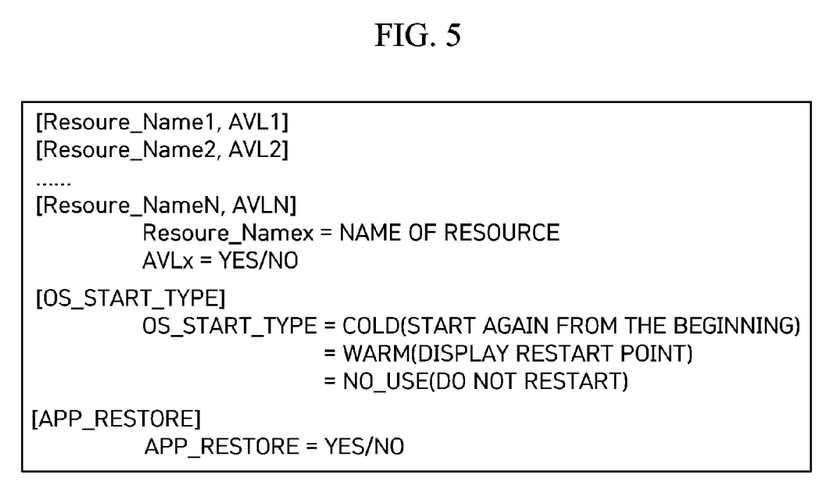
FIG. 5 is an exemplary diagram illustrating architecture transformation information.

If the architecture transformation information 116 of the virtual computer B expressed according to FIG. 5 is

[CDMA_UNIT, YES]
[WIFI_UNIT, YES]
...
[BLUETOOTH_UNIT, YES],
[OS_START_TYPE=COLD]
[APP_RESTORE=NO]

the main unit 101 may recognize that the virtual computer B uses Wi-Fi and Bluetooth communication functions including CDMA. The main unit 101 also recognizes that, during the transition, the OS does not need to restart from the beginning and there is no need to automatically execute, in the virtual computer B, an application program being executed in the virtual computer that is currently activated and in use.

If the virtual computer A and the virtual computer B have the same OS, it is possible to restart the OS in a manner that minimizes the transformation time while minimizing the possibility of malicious code contamination rather than reloading the entire OS.

Meanwhile, in order to speed up the transformation process, a hardware interrupt signal 133 may be used for a communication interface between the main unit 101 and the data storage unit 110. That is, when the data storage unit 110 outputs the interrupt signal 133, the main unit 101 processes the interrupt signal 133 in an interrupt routine without delay, allowing a fast transformation.

Next, when the main unit 101 notifies the data storage unit 110 of the prepared state and awaits, the data storage unit 110 transforms the file system by executing necessary operations including the above-described mapping, and notifies the main unit 101 of this. Since the main unit 101 is in cold start when notified, the main unit 101 calls the bootstrap loader to perform a new booting process including loading of the OS to complete the transformation from the virtual computer A to the virtual computer B.

In the above embodiment, the application programs "Samsung phone," "Samsung message," "Samsung camera," and "Facebook", including the bootable OS, are all installed in the data block of the virtual computer B. Also, the user data storage space of the virtual computer B is also included in the data block. However, transformation to another virtual computer is also possible by means of changing only the user data storage space and application program-related storage space while leaving the OS in the currently used virtual computer.

In this case, the architecture transformation information 116 may be expressed as

[CDMA_UNIT, YES]
[WIFI_UNIT, YES]
...
[BLUETOOTH_UNIT, YES]
[OS_START_TYPE=NO_USE]
[APP_RESTORE=YES]

Here, the main unit 101 stops the application program in execution and retains only the list, and the data storage unit 110 maps the block designated as the file system of the virtual computer B to the user data storage space, and thereafter notifies the standby end to the main unit 101. Thereafter, the application program of the list is re-executed by the main unit 101, thereby completing the transformation. Since ["TikTok," NO_USE] is displayed in the above-described file system configuration information, the data storage unit 110 may control the use of TikTok by, when the main unit 101 accesses an execution program of TikTok, rejecting the access.

Now, since the computer 100 is not in a locked state and the transformation has been completed, the data storage unit 110 transfers information input to the input unit 120 to the main unit 101 as it is. Then, if the computer 100 enters temporarily locked state, the main unit 101 notifies the data storage unit 110 that the computer 100 has been locked. However, even if the main unit 101 does not transfer the information, the manufacturer may sufficiently implement the data storage unit 110 in a manner in which locking or unlocking is independently judged in consideration of information related to the locking, such as, no-input waiting time, power switch input information, or hinge switch input information in the case of a foldable device. In addition, the manufacturer may also make it possible for the data storage unit 110 to independently recognize the moment of unlocking by allowing the user to release the lock by simultaneously pressing the volume adjuster 122 or the power switch 123.

If the user tries to release the lock, the main unit 101 notifies the data storage unit 110 that the unlocking process has started. Accordingly, the data storage unit 110 resumes an operation of receiving and analyzing the user authentication information through the above-mentioned process.

Various functions are required to minimize user inconvenience in the process of transforming a virtual computer to another virtual computer. That is, when there is the information to be shared between the virtual computer that is currently activated and in use and the virtual computer that is newly activated and scheduled to be used, the main unit 101 and the data storage unit 110 may, cooperatively or independently, retain both the content and the format of the shared information according to the user setting information, and when the architecture transformation procedure is completed, they may allow the shared information to be used in a new virtual computer. For example, it may be convenient if there is provided a function that enables messages, photographs, information recorded on notepads or memo pads, files, etc., to be duplicated from a virtual computer A and enables the duplicated information to be used on a virtual computer B.

To this end, a program for cooperative work or independent work is executed in the main unit 101 and the data storage unit 110. At the time, the program executed in the main unit should be implemented according to the program execution environment of the main unit 101, and the program executed in the data storage unit 110 should be implemented according to the program execution environment of the data storage unit.

This process is possible in such a manner that, in the process of transforming the virtual computer, the main unit 101 notifies the data storage unit 110 of the location and format of moving target information and the data storage unit 110 provides such information to a new virtual computer in the same manner. For example, when information obtained by duplicating a text message from the virtual computer A is recorded on a clipboard, the main unit 101 reads information on the clipboard and notifies the data storage unit 110 of the moving target information, and the data storage unit 110 adds the moving target information to the clipboard of the file system of the virtual computer B, thereby enabling data movement. In addition, the application program has the corresponding function and directly transfers the content and format of the moving target information to the data storage unit 110, and after the transformation is completed, the data storage unit 110 transfers the moving target information to the corresponding application program again, so that the content of the moving target information is recorded according to the format, thereby enabling data movement.

Meanwhile, the virtual computer that is currently activated and in use can refer to the architecture information of an inactivated virtual computer. That is, when the main unit of the virtual computer that is currently activated and in use requests information included in architecture information of an inactivated the virtual computer, the requested information may be confirmed and provided when the user allows the request. For example, it is assumed that the user uses the virtual computer A and the virtual computer B, the virtual computer A has personal contact information, and the virtual computer B has business contact information. In addition, it is assumed that the data storage unit 110 stores integrated contact information in which the personal contact information and the business contacts information are integrated in its own storage space and provides the integrated contact information when necessary. In this case, while the user is using the virtual computer A, when there is a conversation request (e.g., when a messenger, phone call, or text message arrives) from another party listed in the business contact information that exists only in the virtual computer B, the communication request may be transferred while the identity of the other party is not revealed. At this point, the user may set to engage in the conversation or to decline the conversation in a predetermined manner.

For example, it is assumed that a person named MR. BACH is registered in the virtual computer B with the phone number 555-1234-5678. Accordingly, when a call comes from MR. BACH while the virtual computer A is in use, the caller is displayed as "555-1234-5678" instead of "MR. BACH." At this time, the user can set that in the program of "Samsung phone," when there is a call from a person who is not on the contact list, a message saying "Now in a meeting" is sent and the call is disconnected.

However, in this case, the main unit 101 may inquire of the data storage unit 110 about whether an unknown counterpart is listed in the contact list of another the virtual computer file system, and the data storage unit 110 may confirm this. Here, the data storage unit 110 internally searches for the integrated contact information or confirms the contact list in the file system of the virtual computer B with reference to architecture information B 112 of the virtual computer B and responds. The information confirmed in this manner may be reflected in state information display of the virtual computer A.

In the above example, the program of "Samsung phone" calls the related program of the OS, transfers the number "555-1234-5678" to the data storage unit 110 to request confirmation of whether the corresponding phone number exists in the contact list, and receives the result. Then a caller display may be changed from "555-1234-5678" to "'MR. BACH" based on the received result.

Next, when a conversation with the other party included only in architecture information B 112 of the virtual computer B proceeds while using the virtual computer A, the currently activated virtual computer A may record the conversation and forward the recorded conversation to the virtual computer B. That is, when the main unit 101 confirms that the contact information of the other party is included in the contact list of the virtual computer B, the relevant information may be transmitted to the data storage unit 110, and the data storage unit 110 may reflect the transmitted information to the file system of the virtual computer B.

For example, when there is an attempted conversation with MR. BACH as described above and the call is automatically rejected, this will be recorded in the call history. However, when there is already the call record with MR. BACH in the virtual computer B, combining these two records would be convenient for the user. Prior to this case, the program of "Samsung phone" of the virtual computer A equipped with a function of managing moving target information generates moving target information and transfers the moving target information to the program of "Samsung phone" of the virtual computer B, so that the call records can be moved and integrated.

Next, a case where a user moves contact information will be described. In the case of a portable computer capable of mobile communication with the outside, such as a mobile phone or tablet, this situation may occur frequently. For example, when a user moves contact information from the virtual computer A to the virtual computer B, a method for processing records so far exchanged with the corresponding contact is required. In this case, when the contact information is moved, the virtual computer A deletes or leaves the related record, and the identity may be displayed and processed only by a corresponding phone number because the contact information has been moved.

At this time, it may be significantly convenient to move the related records of the virtual computer A to the virtual computer B. To this end, it is necessary to understand data architecture of the related records and program the data architecture, and as mentioned above, the supplier of the application program is most suitable for this.

For example, a function of integrating two separate contact information and call records into one may be implemented by modifying the program "Samsung phone," and when the program "Samsung phone" is executed on the main the virtual computer, an additional function may be implemented to receive contact information and call records used by another the virtual computer by making a request to the data storage unit 110. In addition, easily distinguishable file system objects such as photographs and other files can be moved between the virtual computers. For example, a case of moving a photograph from the virtual computer B to the virtual computer A may be considered. When the user accesses the primary virtual computer A and selects data movement in a user setting menu, the user setting program requests information about the entire access path of each file on the file system of the virtual computer B and information about the content of the files from the data storage unit 110. The data storage unit 110 provides relevant information to the user setting program with reference to file system architecture information of the virtual computer B. The user setting program uses this to find directories where pictures are stored, show details of the files, and allow the user to display files or pictures to be moved. When the display ends and the user commands that corresponding information be moved, the user setting program requests information on the corresponding files from the data storage unit 110, receives the requested information, and then stores the received information in a photograph storage directory of the file system of the virtual computer A.

Next, a case where the virtual computer is transformed automatically will be described. For example, the user may transform the virtual computer based on the time by inputting the transformation time and the name of the virtual computer to be transformed in the user setting information. For example, if "the virtual computer A between 09:00 and 18:00" is set, a transformation to the virtual computer A is automatically applied at the time. That is, when the time period begins, a procedure for transformation to a virtual computer A starts when the currently activated computer is not the virtual computer A.

In addition, the user may transform the virtual computer according to his/her location by selecting an area on a map or inputting an address. For example, when Seoul, Korea is set as the virtual computer A, a global positioning system (GPS) starts a procedure for transformation to the virtual computer A when the location of the computer is in Seoul. For example, when the user enters Seoul while using the virtual computer B outside Seoul, a procedure for transformation to the virtual computer A starts.

In addition, the user may designate that the virtual computer A is used in a situation where a specific device is connected. For example, when the computer is connected to a wireless LAN with a specific location and a specific name, or when a Bluetooth device with a specific name is connected, the virtual computer A may be set to be used. That is, if the corresponding units connect, when the currently used architecture does not correspond to the virtual computer A, the computer automatically performs a procedure for transformation to the virtual computer A.

Meanwhile, in order to implement the above functions, the data storage unit 110 needs to be aware of information such as location information of GPS data, time information, or a connection status of a corresponding Bluetooth. This can be solved such that a GPS driver program, a Bluetooth driver program, or an OS executed in the main unit 101 periodically writes corresponding data in a reporting space designated by the data storage unit 110, and the data storage unit periodically refers to the written data.

Meanwhile, the above automatic transformation starts from the data storage unit 110. The data storage unit 110 periodically inspects the transform condition of the virtual computer, and when the transformation is needed, performs the transformation procedure in the same manner as the transformation of the virtual computer, according to the user input information.

However, in this case, when the user authentication information is used to indicate an architecture transformation command, a process of processing the user authentication information is additionally required. In this case, the data storage unit 110 informs the main unit 101 that user authentication is required for transformation to the corresponding the virtual computer, and when the corresponding user authentication is performed through cooperative work with the main unit 101, performs preparatory work and performs the transformation procedure according to the architecture information of the virtual computer subjected to the corresponding user authentication.

For example, the user authentication process may be performed as follows. First, the data storage unit 110 may induce the computer to receive new user authentication information by generating first virtual input information indicating that the computer is locked and transmitting the generated first virtual input information to the main unit 101 and generating second virtual input information as if there were a user's attempt to unlock the corresponding computer after a while, and transmitting the generated second virtual input information to the main unit 101. For example, when the power switch 123 is lightly pressed and released, the lock is performed, and when the power switch 123 is lightly pressed and released again in this state, a user authentication procedure for unlocking is performed. Therefore, according to the present invention, when the power switch 123 which is one of the input units 120 is managed by the data storage unit 110 together, transformation between the virtual computers is possible through an unlocking operation while the user authentication is being processed.

Next, in order to respond to infection by malicious code through a chat window or text message, the virtual computer according to the present invention may activate a predetermined the virtual computer and then activate a link within the virtual computer when the user clicks the corresponding link. For example, the virtual computer T is activated when the user clicks the corresponding link, and may be configured to have an OS and a file system including a malicious code detecting program. When the user clicks the link and needs to execute a new code included in the link, the main unit 101 processes the link as moving target information without executing the link unless the user allows, and transfers link information that is moving target information to the data storage unit 110 through a transformation to the virtual computer, according to architecture information of the virtual computer T to request execution. Accordingly, the data storage unit 110 performs the procedure for transformation to the virtual computer T, and when the transformation is completed, transfers the moved link to the virtual computer T to execute the link.

Therefore, although the link induced installation of the malicious code, the malicious code is installed in empty the virtual computer T with no personal information of the user, so there is no damage at all. At this time, the user can continue working by reconnecting to the virtual computer that was originally used through the locking and unlocking process. In this case, if necessary, the data storage unit 110 stores application program information that was in use before inactivating the virtual computer that was originally used, and then transfers the stored application program information again so that the application program information can be automatically re-executed.

Meanwhile, the user can remove the malicious code by executing a malicious code removal program included in the virtual computer T, or by rebuilding the virtual computer T in the user setting program of the primary virtual computer A Embodiments embodying the spirit of the present invention in detail have been described above. However, the technical scope of the present invention is not limited to the above-described embodiments and drawings, but is determined by reasonable interpretation of the claims.

The invention claimed is:

1. A computer having a transformable architecture between a plurality of virtual computers, the computer comprising:
    a main unit configured to execute an operating system (OS) and an application program and include a central processing unit (CPU) and a memory; and
    a data storage unit connected to the main unit and configured to receive user input information from a user,
    wherein some information included in a file system being used by one or more of the plurality of virtual computers is managed by the data storage unit and stored separately in a storage location inaccessible to the main unit,
    the user input information received by the data storage unit is analyzed independently from the main unit by the data storage unit to determine whether an architecture transformation to one of the plurality of virtual computers should be performed, and according to the analysis, the data storage unit performs at least one of deleting the user input information without transmitting data to the main unit, transmitting original user input information to the main unit, and transmitting information according to an analysis result to the main unit;
    the data storage unit, if the analysis result indicates that the user input information indicates the architecture transformation, determines a file system of the one or more of the plurality of the virtual computers to be activated according to an architecture transformation set by the user, performs a preparatory work for the architecture transformation set by the user to generate architecture transformation information, and transfers the architecture transformation information to the main unit, and
    the main unit performs an architecture transformation procedure according to the architecture transformation information transmitted from the data storage unit to activate other virtual computer for transformation.

2. The computer of claim 1, wherein the preparatory work for architecture transformation includes terminating operations related to a file system being used by a currently activated virtual computer and selecting and activating a file system to be activated among a plurality of file systems according to the user input information.

3. The computer of claim 1, wherein the architecture information includes file system configuration information including information prohibiting an use or installation of the application program, and architecture transformation information including at least one of available resource information to be referred to by the main unit, a restart point of the OS, and information on re-execution of the application program.

4. The computer of claim 1, wherein the user input information that indicates the architecture transformation is user authentication information.

5. The computer of claim 1, wherein the user input information is information indicating the architecture transformation in which the data storage unit receives at least one of time information, space information, and connection/disconnection information of a communication unit from the main unit, compares the received information with the information set by the user, and generates virtual computer information to be newly activated.

6. The computer of claim 1, wherein the user input information includes user authentication information, and the data storage unit transmits only whether user authentication has been successfully passed instead of the user input information to prevent the main unit from distinguishing the user authentication.

7. The computer of claim 1, wherein, when there is shared information between a virtual computer that is currently activated and in use and a virtual computer that is newly activated and scheduled to be used, the main unit and the data storage unit generate and store moving target information including content and a format of the shared information, and when the architecture transformation procedure is completed, allow the moving target information to be used in a new virtual computer.

8. The computer of claim 1, wherein, when a main unit of a virtual computer that is currently activated and in use requests information included in architecture information of an inactivated virtual computer, the data storage unit provides the requested information.

9. The computer of claim 1, wherein the plurality of virtual computers include a primary virtual computer set by the user, and user authentication information and user setting information of other virtual computers are included in setting information of the primary virtual computer.

10. The computer of claim 1, wherein, when the user clicks an executable link while using the virtual computer, a predetermined temporary virtual computer is activated and then the link is activated in the temporary virtual computer.

11. A method for performing transformation between a plurality of virtual computers on a computer having a transformable architecture including a main unit configured to execute an operating system (OS) and an application program and a data storage unit connected to the main unit and configured to receive user input information from a user, the method comprising:

analyzing the user input information by the data storage unit independently from the main unit;

according to the analyzing by the data storage unit, performing at least one of deleting the user input information without transmitting data to the main unit, transmitting original user input information to the main unit, and transmitting information according to an analysis result to the main unit;

determining by the data storage unit whether to perform architecture transformation to one of the plurality of virtual computers;

if it is determined that the architecture transformation should be performed, determining, by the data storage unit, a file system of the one of the plurality of virtual computers to be activated according to architecture transformation set by the user, performing, by the data storage unit, a preparatory work for the architecture transformation set by the user to generate architecture transformation information, and transferring, by the data storage unit, the architecture transformation information to the main unit; and performing an architecture transformation procedure by the main unit according to the architecture transformation information received from the data storage unit to activate other virtual computer for transformation.

12. The method of claim 11, wherein the plurality of virtual computers include a primary virtual computer set by the user, and user authentication information and user setting information of other virtual computers are included in setting information of the primary virtual computer.

13. The method of claim 11, wherein the user input information that indicates the architecture transformation is user authentication information.

14. The method of claim 11, wherein, when there is shared information between a virtual computer that is currently activated and in use and a virtual computer that is newly activated and scheduled to be used, one of the main unit and the data storage unit generates and stores moving target information including content and a format of the shared information, and when the architecture transformation procedure is completed, allows the moving target information to be used in the newly activated virtual computer.

\* \* \* \* \*